JOHN DINSMORE.
Improvement in Leech-Nuts.
No. 127,320. Patented May 28, 1872.
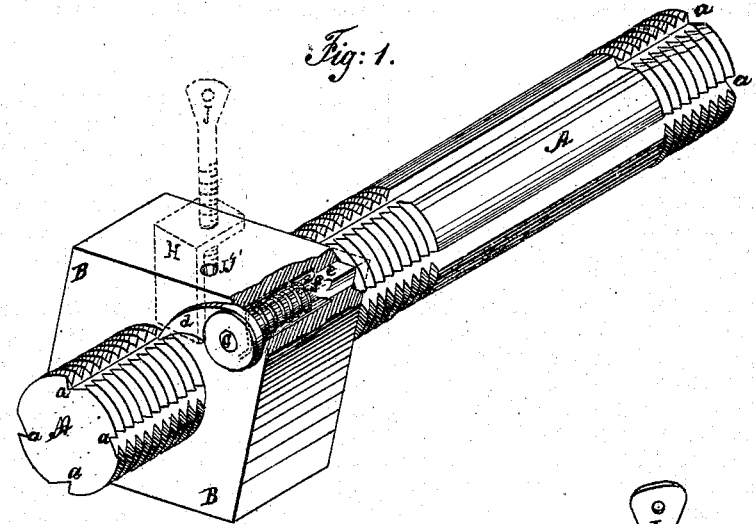
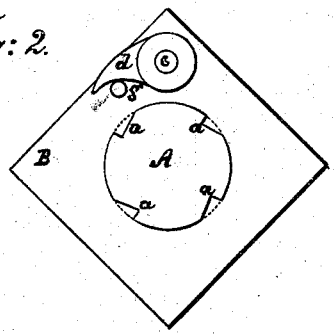
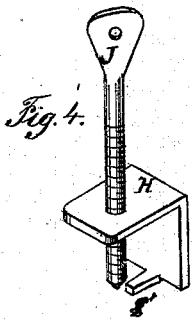
WITNESSES:
INVENTOR:

127,320

UNITED STATES PATENT OFFICE.

JOHN DINSMORE, OF DINSMORE, PENNSYLVANIA.

IMPROVEMENT IN LOCK-NUTS.

Specification forming part of Letters Patent No. 127,320, dated May 28, 1872.

SPECIFICATION.

Be it known that I, JOHN DINSMORE, of Dinsmore, county of Washington, State of Pennsylvania, have invented a new and Improved Lock-Nut for use in railroad fish-joints, bridges, &c.; and I declare the following to be a full, clear, and exact description of same, such as will enable others skilled in the art to which it pertains to make and use it, reference being had to the accompanying drawing which forms a part of this specification.

My invention relates to forming a nut so that as it is screwed on the bolt it will, at successive stages during each revolution, automatically fasten itself, permitting the nut to be fastened more tightly, but admitting of no backward movement.

In the drawing, Figure 1 is perspective view of a nut screwed upon a bolt, in which A is the bolt, with creases or grooves $a\ a$. B is the nut, provided with pawl $d$, which is set on a spindle, $c$, which has a square bottom, $e$. $f$ is a spiral spring, fixed stationary at the bottom, but attached to the pawl $d$ at top. H J is a releasing arrangement, by which the pawl $d$ is removed and held back from the ratchets $a\ a$, that the nut may be taken off.

Fig. 2 is separate view of the nut, showing the end of bolt A, pawl $d$, spindle $e$, and small hole $g$, which, when the pawl is drawn back by the device H, receives the pin K, (in Fig. 3,) and prevents its return.

Fig. 3 is separate view of pin K.

Fig. 4 is separate view of releasing device H. $g$ is the tongue, which catches behind the pawl and pulls it out of the ratchet when the screw J is turned down against the nut.

My invention consists as follows: I prepare the bolt A with two or more creases or grooves, $a\ a$, made abrupt on one edge, and gradually sloped off on the other edge. These creases are so arranged, as shown in the drawing, that when the nut is being screwed on, the pawl will pass successively into and out of them; but whenever the nut is turned in the direction to run it off the bolt, the pawl $d$ impinges against the abrupt edge of the groove, into which it first falls, and prevents it from turning until it is removed by the device H.

When it is desired to remove the nut B, the device H is so placed that the tongue of metal $g'$ is hooked over between the pawl $d$ and bolt A. The screw J is then run down into the small indenture J', (which retains the device H in position,) and then by turning it still further down, the pawl $d$ is drawn out beyond the hole $g$, into which the pin K is inserted, and the nut can then be run off with ease.

The pawl $d$ is attached loosely to the end of the spindle $c$, which spindle is held rigidly by its square base $e$ in the body of the bolt. A spiral spring, $f$, is fastened rigidly at the bottom, and after coiling around the spindle $c$ is attached to the pawl $d$ at the top, and forces the latter strongly against the bolt A. This pawl $d$ is made strong and solid so as to withstand any shock, and is made large enough at its spindle end to cover closely the cavity that contains the spiral spring $f$, and prevents the latter from being weakened by moisture.

The nut B and bolt A may be made of any of the ordinary materials used for such purposes.

This bolt and nut is intended for use in fish-joints, piston-heads, bridges, and in other similar localities where the nut is liable to work off, and thereby produce disastrous results.

I know that a spring and pawl have been used, but not where the strain is one of extension on the fibers of the spring. It is, therefore, liable to break when the surface is a little injured by rust. I do not therefore claim, broadly, the nut provided with a pawl and spring, but limit myself to the device shown and described.

Having thus described my invention, what I claim as new, and desire to secure by Letters Patent, is—

1. In combination with the bolt A, the nut B, provided with spindle $c$, pawl $d$, spiral covered spring $f$, and hole $g$, all constructed, arranged, and operating substantially as set forth and shown.

2. In combination with the above, the releasing device H, provided with tongue $g'$, and screw J, constructed and operating substantially as described and shown.

JOHN DINSMORE.

Witnesses:
   I. D. PETTIT,
   CHAS. ARMSTRONG.